Patented Sept. 13, 1949

2,481,526

UNITED STATES PATENT OFFICE 2,481,526

PROCESS FOR FORMING ACYLCARBAMYL-GUANIDINES

Daniel E. Nagy, Stamford, Conn., assignor to American Cyanamid Company, New York, N. Y., a corporation of Maine No Drawing. Application April 15, 1947, Serial No. 741,680

8 Claims. (Cl. 260—404.5)

This invention relates to a new class of compounds, the acylcarbamylguanidines and the acid addition salts thereof, and to methods for the preparation of such compounds.

The acylcarbamylguanidines of the present invention are of the following formula

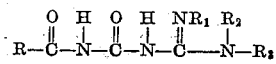

where

is the residue of an organic acid of the group consisting of aliphatic and aromatic acids having a dissociation constant less than $1 \times 10^{-4}$ and $R_1$, $R_2$ $R_3$, are members of the group consisting of hydrogen and alkyl, aralkyl, alicyclic, aryl and heterocyclic radicals with the provision that at least one of such $R_1$, $R_2$, $R_3$ radicals shall be hydrogen. These compounds and the salts thereof are prepared by a process which comprises reacting a dicyandiamide of the formula

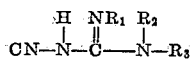

where the R's are as defined above with an organic acid of the type defined above, in the presence of sulfuric acid as a condensing agent. Organic acids such as those above defined which may be used in the process of the invention are as follows:

Aliphatic acids—Acetic, propionic, butyric, isobutyric, valeric, isovaleric, caproic, heptoic, caprylic, capric, undecanoic, undecylenic, methoxyacetic ethoxyacetic, α-alanine, β-alanine, β-bromopropionic, β-chloropropionic, crotonic, glutaric, isocrotonic, suberic, succinic, sebacic, pimelic, adipic, hydrocinnamic, acrylic, propiolic tiglic, hexahydrobenzoic, levulinic, oleic, β-benzoylpropionic, and m-nitrophenylacetic acid.

Aromatic acids—Benzoic, p-isopropylbenzoic, o-benzoylbenzoic, 2,4-dimethylbenzoic, o-(p-tolulyl)-benzoic, o-chlorobenzoic, m-nitrobenzoic and β-naphthoic acid.

The substituent radicals $R_1$, $R_2$, and $R_3$ contained in the substituted dicyandiamides employed in accordance with the process of the invention to provide the corresponding 1-, 1,1- and 1,2-substituted-3-acylcarbamyl-guanidines of the present invention may be alkyl, aryl, aralkyl, alicyclic, or heterocyclic, and may be saturated or unsaturated. Examples of such radicals are methyl, ethyl, methoxyethyl, propyl, isopropyl, γ-methoxypropyl, butyl, isobutyl, hexyl, 2-ethylhexyl, 2,2-diethylhexyl, octyl, dodecyl, octadecyl, allyl, β-chlorallyl, octadecenyl, cyclohexyl, cyclopentyl, benzyl, β-phenyethyl, naphthylmethyl, phenyl, o-tolyl, p-tolyl, o-xylyl, p-xylyl, α-naphthyl, β-naphthyl, diphenylyl, p-sulfophenyl, p-sulfonamidophenyl, sulfonaphthyl, sulfotolyl, o-tolyl, p-chloro-o-tolyl, p-bromo-o-tolyl, p-sulfonyl-o-tolyl, o-chlorophenyl, o-bromophenyl, p-chlorophenyl, p-bromophenyl, p-methoxyphenyl, p-ethoxyphenyl, furfuryl, thienyl, and the like. Also $R_2$ and $R_3$ may be joined together to form with the nitrogen atom to which they are attached pyridyl, piperidyl, piperazyl, pyrazyl, pyrimidyl and like radicals.

Marckwald (Annalen, vol. 286, p. 345) has shown that the two nitrogen atoms of an amidine are equivalent, through the mechanism of tautomerism, and proves that a compound of the structure

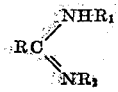

is identical to a compound of the structure

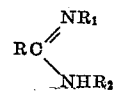

For example (Ann., p. 346) the diphenylguanidine obtained by reacting mercuric chloramide and diphenylthiourea, thus:

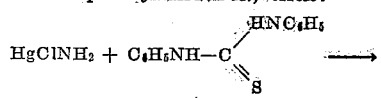

is identical to the diphenylguanidine obtained by reacting mercuric chloranilide and phenylthiourea, thus:

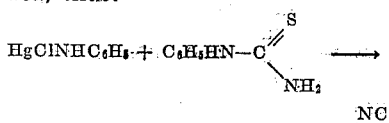

Other examples are given in the reference cited to elaborate the point.

It will be observed that classical formulas are inadequate to define the structure of the amidines. Therefore, in the specification and claims, although classical structural formulas are given for want of better, it will be understood that a substituent (or substituents) on one nitrogen atom of the amidino radical,

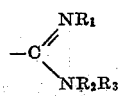

gives a compound identical to the compound bearing that substituent (or those substituents) on the other nitrogen atom. For example, a dicyandiamide of the formula

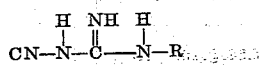

is identical with a dicyandiamide of the formula

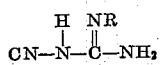

the compound

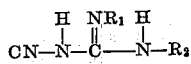

is the same as

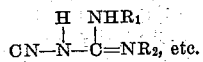

Heretofore, dicyandiamide has been reacted with organic acids without the presence of a strong acid condensing agent, at high temperatures and under conditions otherwise different from those employed in the present invention to obtain a mixture of products from which have been isolated materials described as acylammelines. It was not to be expected, therefore, that dicyandiamide could be reacted with organic acids of the aforesaid type to provide the acylcarbamylguanidines, and salts thereof, of the present invention.

The 1- and 1,1-substituted dicyandiamides which may be used in preparing the 1- and 1,1-substituted-3-acylcarbamylguanidines in accordance with the process of the invention are prepared by reacting a primary or secondary amine with a dicyanimide. The general reaction is given by Equation 1 in which the R's have the meaning given above.

(1) 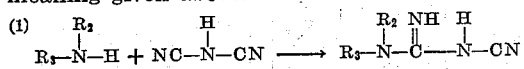

In the above equation dicyanimide is employed. However, dicyanimide salts such as those of calcium, sodium, potassium and the like may also be employed, and in practice it is preferred to employ such dicyanimide salts.

The 1,2-disubstituted dicyandiamides employed in carrying out the reaction of the present invention are prepared by treating a disubstituted thiourea with cyanamide and lead, mercury or silver oxide. Such 1,2-disubstituted dicyandiamides may also be prepared from the correspondingly disubstituted thioureas by reaction with the cyanamide salts of lead, mercury, or silver, and another method involves the reaction of cyanamide with the correspondingly disubstituted carbodiimide. Such disubstituted thioureas are in turn prepared by reacting the appropriate amine with a substituted isothiocyanate, or they may be prepared by reacting the appropriate amines with carbon disulfide. The preparation of these compounds from the disubstituted thiourea is shown by Equation 2 in which lead cyanamide is used only as an example, other cyanamide salts of dethionating agents being also suitable.

(2) 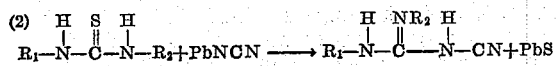

The preparation of the 1,2-disubstituted dicyandiamides from the correspondingly disubstituted carbodiimides by reaction with cyanamide is shown in Equation 3.

(3) 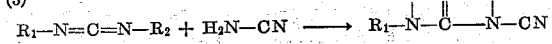

As indicated hereinabove, the reaction of the invention is carried out in the presence of sulfuric acid as a condensing agent. Care should be taken to avoid reaction between the dicyandiamide and the sulfuric acid, however. In observing this precaution a variety of reaction techniques may be employed, e. g., the dicyandiamide may be added to a mixture of the organic acid and the sulfuric acid or a mixture of the reactants may be added to the sulfuric acid. Other techniques more suitable for the reaction of the dicyandiamide with a specific organic acid may also be employed so long as the above consideration is kept in mind. Said consideration, however, does not prohibit the addition of an excess of the dicyandiamide to the reaction mixture when such is desired in view of the expense of the organic acid being employed. In such a case, the tendency for reaction to occur between the dicyandiamide and the sulfuric acid is ignored in order to obtain maximum yields of the acylcarbamylguanidine by using the dicyandiamide in excess. The use of lower temperatures of reaction, particularly at the time when such excess of the dicyandiamide reactant is added to the reaction mixture, is helpful in minimizing the aforementioned side-reaction.

In general, the temperatures to be employed in carrying out the reaction of the invention may be somewhat widely varied and the temperature to be used in a given case will depend somewhat upon the solubility of the organic acid in the sulfuric acid or any inert solvent that may be employed and/or upon the melting point of said organic acid. Organic acids being quite generally soluble in sulfuric acid it is often desirable to employ the latter in appreciable excess to serve as a solvent as well as a condensing agent. Other solvents or diluents may also be used although generally their use offers no advantage over the use of sulfuric acid. When undissolved organic acid is present, vigorous stirring to keep such organic acid thoroughly distributed throughout the reaction mixture will help to provide best results. In order to obtain best results the reaction should be carried out at low temperatures whenever feasible, temperatures below about 75° C. being preferable.

While the ratio of sulfuric acid which may be employed may be varied somewhat widely, it is preferred that it be employed in a ratio of at least a mol of sulfuric acid per mol of dicyandiamide. Since, as mentioned hereinafter, it is preferred that the reaction mixture be maintained anhydrous it is best that the sulfuric acid employed be concentrated, acid containing at least 95% of $H_2SO_4$ or 77.5% $SO_3$ being preferred.

While the reaction mixture does not need to be maintained anhydrous, nevertheless, best results will be found to obtain when substantially anhydrous conditions are maintained. Thus, it is advantageous, although not necessary, to employ some organic acid anhydride, corresponding to the acid to be reacted, to the reaction mixture if sulfuric acid of a concentration less than that corresponding to an $SO_3$ content of 77.5% is employed. Such anhydride reacts with the water present to form more of the organic acid and helps to maintain substantially anhydrous conditions. If desired, the acid anhydride may be added to the exclusion of the corresponding organic acid when the sulfuric acid is not sufficiently concentrated so that the organic acid is produced by reacting with the water present and the desired anhydrous conditions are thereby obtained. When fuming sulfuric acid, or oleum, is used it is unnecessary to add such organic acid anhydride.

The present invention also contemplates the preparation of the acid addition salts of the acylcarbamylguanidines. The product provided in the first instance by the process of the present invention is the sulfate of the acylcarbamylguanidine so produced. The free base is obtained therefrom by careful neutralization with a base stronger than the acylcarbamylguanidine. Such bases are sodium hydroxide, potassium hydroxide, calcium hydroxide, and the like. The free base may then be converted to the desired acid addition salt by treatment with the corresponding acid. Also, some salts of the acylcarbamylguanidines may be prepared by the double decomposition of an acylcarbamylguanidine salt and another salt, particularly when one of such salts resulting from such double decomposition is insoluble. Examples of acids suitable for forming salts of the acylcarbamylguanidines are as follows: hydrochloric, hydrobromic, nitric, sulfuric, sulfurous, pyrosulfuric, metaphosphoric, orthophosphoric, carbonic, acetic, propionic, butyric, 2-ethylhexanoic, lauric, stearic, crotonic, oleic, malonic, chloroacetic, succinic, oxalic, maleic, sebacic, citric, lactic, α-hydroxyisobutyric, benzoic, chlorobenzoic, nitrobenzoic, salicylic, phthalic, naphthoic, p-toluenesulfonic, picric, and the like.

Typical acylcarbamylguanidines and their salts, including their preparation and properties, are described in the following examples.

EXAMPLE 1

Preparations of acetylcarbamylguanidine

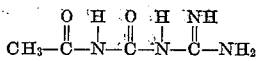

and salts thereof (a)

| Reactants: | Molar ratio |
|---|---|
| Dicyandiamide | 1.00 |
| Acetic acid | 4.35 |
| Acetic anhydride | 0.70 |
| Sulfuric acid, 95% | 1.19 |

The acetic anhydride and acetic acid are mixed in the reaction vessel equipped with a mechanical stirrer for vigorous mixing, and the sulfuric acid is added carefully with sufficient external cooling so that the temperature range is 25°–30° C. The acetic anhydride reacts with the water in the sulfuric acid so that substantially anhydrous conditions are obtained for the reaction.

The dicyandiamide, preferably in a finely divided state, is added carefully to the acid mixture at such a rate that very little undissolved dicyandiamide is present at any stage in the reaction. Under the above conditions the dicyandiamide dissolves quickly. The reaction is an exothermic one, and during the addition of the first half of the dicyandiamide, the temperature is allowed to rise from 30° C. to 50° C. but not higher. After the first half of the dicyandiamide is added, well-formed crystals of acetylcarbamylguanidine acid sulfate start to precipitate from the reaction mixture. The temperature is then permitted to rise, and the second half of the dicyandiamide is added at from 50° C. to 70° C. After the addition of the dicyandiamide is complete, the exothermic reaction stops and the temperature starts to fall.

Continued stirring and cooling to room temperature insures substantially complete precipitation of the acetylcarbamylguanidine acid sulfate. This colorless crystalline solid is filtered, washed free of acid with carbon tetrachloride, and recrystallized from water to remove solid impurities. The yield obtained is 90% of theory. The acid sulfate is converted to the neutral sulfate by this treatment as shown by a titration of the large amount of acid left in the filtrate. After drying, the neutral sulfate salt, which forms a hydrate, sinters at 110°–120° C. and melts with decomposition at 207°–210° C. The pH of an aqueous solution is 4 to 5. Either the neutral or acid sulfate, when suspended in cold water and made slightly alkaline with ammonia, dissolves and the free base, acetylcarbamylguanidine, precipitates. After recovery and drying, the product does not sinter when heated slowly to 315° C., but when fresh samples are introduced into a melting point bath at 200°–250° C., they sinter immediately to form a new solid compound.

The neutral phthalate salt, melting at 183°–185° C., is easily prepared from acetylcarbamylguanidine neutral sulfate and diammonium phthalate by double decomposition.

The acetate salt, prepared from molecular equivalent quantities of the free acetylcarbamylguanidine and acetic acid, sinters at 130° C. to another solid which does not melt up to 315° C.

Treatment of the above salts with strong alkali, or warming an aqueous solution of the free base, or continued heating of the salts causes conversion to 2-amino-4-hydroxy-6-methyl-1,3,5-triazine, sometimes called acetoguanide.

(b)

| Reactants: | Molar ratio |
|---|---|
| Dicyandiamide | 1.00 |
| Acetic acid | 4.50 |
| Fuming sulfuric acid (4% free $SO_3$) | 1.68 |

The procedure and care used in this preparation are the same as that described in Example 1(a) with the exception that the temperature is not allowed to rise above 50° C. The free base is recovered as before in 79.5% yield of theory.

(c)

| Reactants: | Molar ratio |
|---|---|
| Dicyandiamide | 1.00 |
| Acetic acid | 2.80 |
| Acetic anhydride | 0.35 |
| Sulfuric acid, 95% | 0.55 |

The procedure and care used in this preparation is that described for Example 1(a) with the exception that the reaction temperature range is 60°–85° C. The free base is recovered in 51.5% yield of theory.

EXAMPLE 2

Preparation of Lauroylcarbamylguanidine

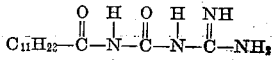

and salts thereof

| Reactants: | Molar ratio |
|---|---|
| Dicyandiamide | 1.00 |
| Lauric acid | 0.88 |
| Sulfuric acid, 3% free $SO_3$ | 9.10 |

The lauric acid is added carefully to the sulfuric acid and dissolves readily without an exothermic reaction. The dicyandiamide, preferably in a finely divided state, is added slowly so that it remains in contact with the sulfuric acid for only a short time interval prior to its reaction with the lauric acid. Vigorous mechanical stirring is desirable in this reaction to prevent caking. The reaction is smooth and there is no noticeable lag or induction period at the start of the reaction. The temperature range for this reaction is maintained at 20°–30° C.

When the reaction is complete as evidenced by the termination of the exothermic reaction, the reaction mixture is carefully poured into cracked ice so that a precipitate of the lauroylcarbamylguanidine sulfate is formed. The solid is filtered and washed thoroughly with water and acetone to remove any unreacted lauric acid. This salt, lauroylcarbamylguanidine neutral sulfate, is obtained in a yield of 94% of theory, decomposes with effervescence at 186°–189° C. and is insoluble in hot water. The salt is then suspended in methanol and treated with a slight excess of ammonia. After vigorous stirring and cooling in an ice bath, the mixture is diluted with water and filtered. Dry lauroylcarbamylguanidine, obtained in a yield of 75% of theory, sinters markedly at 95°–100° C. and melts at 220° C. The dry free base which is stable at room temperature is soluble in warm water acidified with acetic acid or hydrochloric acids.

Di-lauroylcarbamylguanidine phosphate is prepared by adding a molecular equivalent amount of phosphoric acid to an acetic acid-water mixture of the free base. This salt, after drying, softens at 145° C. and melts with effervescence at 149°–155° C.

Lauroylcarbamylguanidine hydrochloride is prepared by adding a molecular equivalent of hydrochloric acid to an acetic acid-water slurry of the free base. This reaction mixture is warmed until the free base dissolves, and after filtering the solution is cooled so that the salt will crystallize. The crystals of the hydrochloride salt, after recovery and drying, melt with effervescence at 205°–206° C.

Lauroylcarbamylguanidine acetate is prepared by dissolving the free base in warm acetic acid and recovering crystals of the salt after cooling the reaction mixture. Dry lauroylcarbamylguanidine acetate has a melting point which depends on the rate of heating. It softens beginning about 90°–95° C. and melts with effervescence between 125° and 145° C.

When solutions of the salts or free base are boiled, 2-amino-4-hydroxy-6-undecyl-1,3,5-triazine, sometimes called lauroguanide, is gradually formed.

EXAMPLE 3

Preparation of benzoylcarbamylguanidine

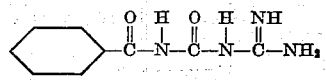

and salts thereof

Reactants: Molar ratio
Dicyandiamide _____ 1.00
Benzoic anhydride_____ 1.00
Sulfuric acid, 95%_____ 1.95
Carbon tetrachloride_____ 1.56

The sulfuric acid is carefully added to the carbon tetrachloride solution of benzoic anhydride, and heated to 55°–60° C. Vigorous mechanical stirring is needed during the slow addition of the dicyandiamide, which is added preferably in a finely divided state. A colorless solid reaction product is formed, and after filtering the cake is washed with water and acetone. The solid is recrystallized from hot water to give benzoylcarbamylguanidine neutral sulfate, which yields benzoylcarbamylguanidine when carefully neutralized with ammonia in the cold. Since the salts are more stable than the free base, it is preferred to store the benzoylcarbamylguanidine as a salt.

The neutral sulfate salt melts with effervescence at 110° C., and on further heating this product solidifies at 205° C. only to decompose again at 270° C.

Benzoylcarbamylguanidine p-toluenesulfonate is prepared in water from molecular equivalent quantities of the free base and p-toluenesulfonic acid. The salt is slightly soluble in hot water and crystallizes therefrom in clusters of needles which, when dry, melt with decomposition at 212°–213° C.

Benzoylcarbamylguanidine benzoate, being insoluble in water and acetone, is prepared in methanol from molecular equivalent quantities of the free base and benzoic acid. The dry salt softens gradually, beginning at 160° C., and decomposes at 314°–316° C.

Benzoylcarbamylguanidine nitrate is prepared from molecular equivalent quantities of the free base and nitric acid, and is soluble in water from which it crystallizes as long needles. The above dry product is a hydrate, but on heating this moisture is driven off. The nitrate salt melts at 175°–177° C. with decomposition.

The sulfamate salt of benzoylcarbamylguanidine is very soluble in water.

Treatment of benzoylcarbamylguanidine salts with alkali or heating an aqueous solution of the salt or free base results in the formation of 2-amino-4-hydroxy-6-phenyl-1,3,5-triazine, often called benzoguanide.

EXAMPLE 4

Preparation of p-methylbenzoylcarbamylguanidine

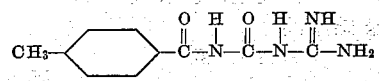

and salts thereof.

Reactants: Molar ratio
Dicyandiamide _____ 1.00
p-toluic acid _____ 0.88
Sulfuric acid, 3% free SO$_3$ _____ 9.10

The reactants, dicyandiamide, p-toluic acid, and oleum, are mixed following substantially the same procedure as described in Example 2.

After recrystallization from hot water the p-methylbenzoylcarbamylguanidine neutral sulfate melts with effervescence at 165°–170° C., and this product solidifies at 195° C. only to darken at 270° C. and again decompose at 300° C. The free p-methylbenzoylcarbamylguanidine is prepared from an aqueous slurry of the salt by careful neutralization with ammonia. This colorless solid is recovered and dried, but it does not melt when placed in a melting point bath and heated slowly to 316° C. However, a fresh sample sinters when it is placed in a melting point bath at 230° C. This free base, like the benzoylcarbamylguanidine, is best stored as a salt. Heating the salt or free base and treatment of either with alkali causes the formation of 2-amino-4-hydroxy-6-p- tolyl-1,3,5-triazine, sometimes called p-methyl-benzoguanide, which does not melt below 315° C.

EXAMPLE 5

*Preparation of Sebacylcarbamylguanidine*

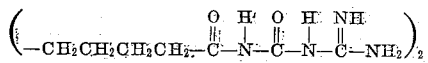

and salts thereof.

| Reactants: | Molar ratio |
|---|---|
| Dicyandiamide | 1.00 |
| Sebacic acid | 0.45 |
| Sulfuric acid, 100% | 7.40 |

The sebacic acid and the dicyandiamide are first ground and mixed thoroughly. This solid mixture is added to the 100% sulfuric acid in small portions at 25°–35° C. while the reaction mixture is stirred vigorously. When the addition of the solid is complete, continued stirring is maintained until the reaction is no longer exothermic. The reaction mixture is carefully diluted with an excess of water, and the insoluble sebacylcarbamylguanidine neutral sulfate is filtered from solution. The free base is generated by the careful addition of a slight excess of ammonia to an aqueous slurry of the sulfate in water and is obtained in a yield of 30% of theory.

The neutral sulfate salt is also prepared in water from the free base and a molecular equivalent of sulfuric acid. The resulting sebacylcarbamylguanidine neutral sulfate is then recrystallized from water. The salt, after recovery and drying, softens at 138° C. and melts with decomposition at 145°–146° C. Sebacylcarbamylguanidine nitrate is prepared from the free base and nitric acid in hot water. This salt is less soluble than the sulfate, and is easily recovered from the reaction mixture. Dry sebacylcarbamylguanidine nitrate melts with vigorous decomposition at 184° C.

If solutions of either the salts or free base are subjected to continued heating or treatment with excess alkali, sebacoguanide is obtained which, after recovery and drying, decomposes slowly when held at 315° C.

EXAMPLE 6

*Preparation of 1-cycohexyl-3-acetylcarbamylguanidine*

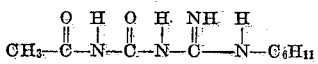

and salts thereof.

| Reactants: | Molar ratio |
|---|---|
| 1-cyclohexyldicyandiamide | 0.21 |
| Acetic acid | 1.5 |
| Acetic anhydride | 0.15 |
| Sulfuric acid (95%) | 0.27 |

The sulfuric acid is first mixed with the acetic acid-acetic anhydride mixture, and then the 1-cyclohexyldicyandiamide is added at 50°–60° C. in 12 minutes giving complete solution. The sulfate salt of the 1-cyclohexyl-3-acetylcarbamylguanidine is completely soluble in the acetic acid and also in water. The free base is recovered as a soft solid by neutralizing the acid with ammonia. When the filtered product is spread out on a tray to air-dry it partly melts and a large quantity of water separates from the pasty solid.

The free 1-cyclohexyl-3-acetylcarbamylguanidine is soluble in acetone, and also in dilute acids. When a portion is heated with water it first forms a gum which then dissolves completely and almost immediately a precipitate of 6-N-cyclohexylacetoguanide forms. The guanide is also obtained when the 1-cyclohexyl-3-acetylcarbamylguanidine is dissolved in sodium hydroxide and reprecipitated with acid or when an acetic acid solution is heated on the steam bath for a short time.

After air drying overnight the carbamylguanidine cyclizes to the guanide.

1-cyclohexyl-3 - acetylcarbamylguanidine hydrochloride is prepared by adding a molecular equivalent of hydrochloric acid to an acetic acid-water slurry of the free base. This reaction mixture is warmed until the free base dissolves, and after filtering the solution is cooled so that the salt will crystallize.

EXAMPLE 7

*Preparation of 1-dodecyl-3-acetylcarbamyl-guanidine*

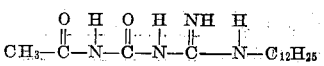

and salts thereof.

| Reactants: | Molar ratio |
|---|---|
| 1-dodecyldicyandiamide | 0.2 |
| Acetic acid | 2.0 |
| Acetic anhydride | 0.2 |
| Sulfuric acid (95%) | 0.324 |

The dodecyldicyandiamide is added to a mixture of the other reactants in 20 minutes at 50° C. as described in Example 6. After addition, the clear, cooled reaction mixture is diluted with water which precipitates the neutral sulfate salt. After air-drying, the 1-dodecyl-3-acetylcarbamylguanidine sulfate weighs 72 g. or 85% of the theoretrical yield. The salt is quite soluble in methanol and ethanol, slightly soluble in acetone, and is readily crystallized from isopropanol. The crude product decomposes at 120°–122° C. and a sample after one crystallization from isopropanol still decomposes at 120° C.

N-dodecylacetoguanide is made in the usual manner by alkali cyclization from the acylcarbamylguanidine and melts at 190° C.

1-dodecyl-3 - acetylcarbamylguanidine acetate is prepared by dissolving the free base in warm acetic acid and recovering crystals of the salt after cooling the reaction mixture.

EXAMPLE 8

*Preparation of 1,1-dibutyl-3-acetylcarbamyl-guanidine*

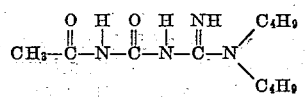

and salts thereof.

| Reactants: | Molar ratio |
|---|---|
| 1,1-dibutyldicyandiamide | 0.18 |
| Sulfuric acid (95%) | 0.27 |
| Acetic anhydride | 0.15 |
| Acetic acid | 2.0 |

The 1,1-dibutyldicyandiamide is added in small portions at 55° C. in 15 minutes in the usual manner to the other chemicals. The cooled clear solution is diluted with water and made neutral with ammonia. The gum which forms does not crystallize. It is readily soluble in dilute acids and is transformed into 6-N-dibutylacetoguanide when treated with alkali. This guanide melts at 102° C. and the melting point is not changed when the material fused with the sample previously prepared by another method.

On standing overnight at room temperature the gummy acylcarbamylguanidine spontaneously cyclizes to the guanide.

1,1-dibutyl-3-acetylcarbamylguanidine nitrate is prepared by using equimolar quantities of the free base and nitric acid, and said nitrate salt is soluble in water from which it may be readily crystallized on cooling.

EXAMPLE 9

*Preparation of 1,2-diphenyl-3 - acetylcarbamylguanidine*

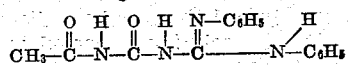

and salts thereof.

| Reactants: | Molar ratio |
|---|---|
| 1,2-diphenyldicyandiamide | 1.00 |
| Acetic acid | 4.50 |
| Acetic anhydride | 0.70 |
| Sulfuric acid (95%) | 1.19 |

The 1,2-diphenyldicyandiamide is added over a period of 30 minutes to a mixture of the other reactants at 50° C. as described in Example 6. After such addition, the reaction mixture is cooled and diluted with water to precipitate the neutral sulfate salt of the 1,2-diphenyl-3-acetylcarbamylguanidine. The salt is somewhat soluble in methanol and ethanol, somewhat less soluble in acetone and in water. The free 1,2-diphenyl-3-acetylcarbamylguanidine is recovered as a soft solid by suspending the sulfate thereof in an aqueous solution of sodium hydroxide. The free 1,2-diphenyl-3-acetylcarbamylguanidine is soluble in acetone and also in dilute acids.

1,2-diphenyl-3 - acetylcarbamylguanidine benzoate, being insoluble in water and acetone, is prepared in methanol by using equimolar quantities of the free base and benzoic acid.

EXAMPLE 10

*Preparation of 1-phenyl-3-acetylcarbamylguanidine*

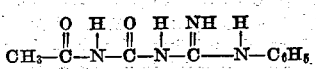

and salts thereof.

| Reactants: | Molar ratio |
|---|---|
| 1-phenyldicyandiamide | 0.143 |
| Acetic acid | 1.0 |
| Acetic anhydride | 0.1 |
| Sulfuric acid (95%) | 0.17 |

The sulfuric acid is added to the acetic acid—acetic anhydride mixture with stirring and cooling. However, the temperature of the mixture rises to 43° C. The 1-phenyldicyandiamide is added in small portions over a period of 10 minutes. It dissolves readily with some evolution of heat. At the end of such addition the temperature has risen to 56° C. After further cooling the reaction mixture, said mixture is diluted with ice water and made slightly alkaline to precipitate the 1-phenyl-3-acetylcarbamylguanidine free base as a soft gum. The product is dissolved in ethanol at room temperature, avoiding the use of high temperatures, and recrystallized by the slow addition of water thereto. The thus purified 1-phenyl-3-acetylcarbamylguanidine is obtained as a soft solid melting over a low temperature range.

When the clear alkaline solution thereof is neutralized 4-N-phenylacetoguanide is precipitated as an amorphous solid which becomes more dense when heated on a steam bath.

The acylcarbamylguanidines described herein do not give the characteristic copper complex which is obtained from guanylureas.

Acids which react with sulfuric to form sulfonated materials are preferred to be reacted with sulfuric acid prior to their reaction with the dicyandiamide. Acids which are subject to this condition are those containing hydroxyl groups, aliphatic unsaturation, and others susceptible to sulfonation and/or reaction with the acid acting as the condensing agent for the reaction of the present invention.

The acylcarbamylguanidine salts of this invention are themselves intermediates and latent curing agents for resins and are useful in the preparation of other chemical intermediates, textile chemicals, plastics, resins, and the like.

While this invention has been described with reference to specific embodiments, it is to be understood that it is not to be limited thereto but is to be construed broadly and restricted solely by the scope of the appended claims.

The present application is a continuation-in-part of Serial Nos. 579,304 and 579,305, filed February 22, 1945, now abandoned.

What is claimed is:

1. A method of preparing a member of the group consisting of an acylcarbamylguanidine of the formula

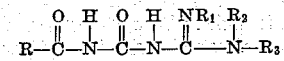

and an acid addition salt thereof, where

is the residue of an aliphatic acid having a dissociation constant less than $1 \times 10^{-4}$, and $R_1$, $R_2$ and $R_3$ are members of the group consisting of hydrogen, alkyl, cycloalkyl and aryl radicals where at least one of such $R_1$, $R_2$ and $R_3$ radicals is hydrogen, which comprises reacting a dicyandiamide of the formula

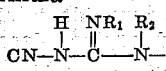

where $R_1$, $R_2$ and $R_3$ are as defined above, with an organic acid of the type defined above in the presence of sulfuric acid.

2. The method of claim 1 in which the sulfuric acid has an $SO_3$ content of at least 77.5%.

3. The method of claim 1 in which the sulfuric acid has an $SO_3$ content of at least 77.5% and at least a mole of sulfuric acid is employed per mole of dicyandiamide reactant.

4. The method of claim 1 in which the sulfuric acid has an $SO_3$ content of at least 77.5%, at least a mole of sulfuric acid is employed per mole of the dicyandiamide reactant, and the temperature of reaction is maintained below 75° C.

5. A method of preparing an acylcarbamylguanidine of the formula

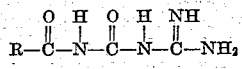

where

is the residue of an aliphatic acid having a dissociation constant less than $1 \times 10^{-4}$, which comprises reacting dicyandiamide with an organic acid of the type defined above, in the presence of sulfuric acid, adding a base to free the acylcarbamylguanidine, and recovering the thus-formed acylcarbamylguanidine.

6. A method of preparing acetylcarbamylguanidine, which comprises reacting dicyandiamide and acetic acid by adding dicyandiamide and acetic acid by adding dicyandiamide to a mixture of acetic acid and sulfuric acid of at least 77.5% $SO_3$ content, a mol of sulfuric acid being employed per mol of dicyandiamide and the temperature of reaction being maintained below 75° C, adding a base to free acetylcarbamylguanidine, and recovering the thus-formed acetylcarbamylguanidine.

7. A method of preparing lauroylcarbamylguanidine, which comprises reacting dicyandiamide and lauric acid by adding dicyandiamide to a mixture of lauric acid and sulfuric acid of at least 77.5% $SO_3$ content, a mol of sulfuric acid being employed per mol of dicyandiamide and the temperature of reaction being maintained below 75° C., adding a base to free the lauroylcarbamylguanidine, and recovering the thus-formed lauroylcarbamylguanidine.

8. A method of preparing sebacylcarbamylguanidine, which comprises reacting dicyandiamide and sebacic acid by adding dicyandiamide to a mixture of sebacic acid and sulfuric acid of at least 77.5% $SO_3$ content, a mole of sulfuric acid being employed per mole of dicyandiamide, and the reaction temperature being maintained below 75° C., adding a base to free sebacylcarbamylguanidine, and recovering the thus-formed sebacylcarbamylguanidine.

DANIEL E. NAGY.

REFERENCES CITED

The following references are of record in the file of this patent:

UNITED STATES PATENTS

| Number | Name | Date |
|---|---|---|
| 2,397,667 | Kaiser et al. | Apr. 2, 1946 |

OTHER REFERENCES

Ostrogovich, "Gazz. Chimica Italiani," vol. 39, part I (1908) pp. 540 to 549.